(12) United States Patent
Prem et al.

(10) Patent No.: US 9,096,263 B2
(45) Date of Patent: Aug. 4, 2015

(54) OPERATION OF SELF-STEERING AXLES ON SEMI-TRAILERS

(75) Inventors: Hans Prem, Templestowe (AU); Kinh-Luan Viet Mai, Vermont South (AU)

(73) Assignee: Mechanical System Dynamics Pty Ltd, Templestowe (AU)

(*) Notice: Subject to any disclaimer, the term of this patent is extended or adjusted under 35 U.S.C. 154(b) by 1119 days.

(21) Appl. No.: 12/299,957

(22) PCT Filed: May 8, 2007

(86) PCT No.: PCT/AU2007/000609
§ 371 (c)(1),
(2), (4) Date: Nov. 7, 2008

(87) PCT Pub. No.: WO2007/128072
PCT Pub. Date: Nov. 15, 2007

(65) Prior Publication Data
US 2009/0236823 A1    Sep. 24, 2009

(30) Foreign Application Priority Data
May 8, 2006 (AU) ............................... 2006902381

(51) Int. Cl.
*B62D 13/02* (2006.01)
*B62D 13/04* (2006.01)
*B62D 13/00* (2006.01)

(52) U.S. Cl.
CPC ............ *B62D 13/005* (2013.01); *B62D 13/025* (2013.01); *B62D 13/04* (2013.01)

(58) Field of Classification Search
CPC ..... B62D 13/005; B62D 13/025; B62D 13/04

USPC ............................... 280/419, 423.1, 426, 442
See application file for complete search history.

(56) References Cited

U.S. PATENT DOCUMENTS

| | | | | | |
|---|---|---|---|---|---|
| 1,876,684 | A | * | 9/1932 | Jonkhoff | 280/442 |
| 2,230,567 | A | * | 2/1941 | Henderson | 280/458 |
| 2,342,697 | A | * | 2/1944 | Runyan | 280/426 |
| 2,968,495 | A | * | 1/1961 | Hutchens | 280/426 |
| 3,225,852 | A | * | 12/1965 | Simmons et al. | 180/14.2 |
| 3,690,698 | A | * | 9/1972 | Humes | 280/426 |
| 3,734,538 | A | * | 5/1973 | Humes | 280/426 |
| 4,212,483 | A | * | 7/1980 | Howard | 280/444 |
| 4,441,730 | A | * | 4/1984 | Damm | 280/426 |
| 4,494,766 | A | * | 1/1985 | McHugh et al. | 280/444 |

(Continued)

FOREIGN PATENT DOCUMENTS

| | | |
|---|---|---|
| DE | 2947223 A1 | 6/1981 |
| WO | 2004/083019 A1 | 9/2004 |
| WO | 2004/098981 A1 | 11/2004 |

*Primary Examiner* — Anne Marie Boehler
*Assistant Examiner* — Maurice Williams
(74) *Attorney, Agent, or Firm* — Hogan Lovells US LLP

(57) ABSTRACT

A method of controlling the sideways motion of a trailer forming part of a combination vehicle, such as a road train, for road transport of heavy goods. The vehicle has a trailer including a semi-trailer body and a dolly mounted beneath the front of the semi-trailer body. The method includes steering at least some of the wheels on said axle sets relative to the dolly frame such that at high speeds, as the vehicle turns towards one side, steering the dolly wheels to induce the dolly to move towards that side and, at low speeds, as said vehicle turns towards that side, steering the dolly wheels to induce the dolly to move towards the opposite side.

13 Claims, 14 Drawing Sheets

(56) References Cited

U.S. PATENT DOCUMENTS

| | | | |
|---|---|---|---|
| 4,740,006 A * | 4/1988 | Ducote | 280/426 |
| 4,982,976 A * | 1/1991 | Kramer | 280/426 |
| 5,013,057 A * | 5/1991 | Vanninmaja et al. | 280/426 |
| 5,035,439 A * | 7/1991 | Petrillo | 280/81.6 |
| 5,246,242 A * | 9/1993 | Penzotti | 280/426 |
| 6,059,056 A * | 5/2000 | Becker | 180/24.01 |
| 6,131,691 A * | 10/2000 | Morch | 180/418 |
| 6,450,523 B1 | 9/2002 | Masters et al. | |
| 7,726,423 B2 * | 6/2010 | Atley | 180/24.01 |
| 2004/0104555 A1* | 6/2004 | Atley | 280/426 |
| 2009/0273159 A1* | 11/2009 | Sutton | 280/419 |

* cited by examiner

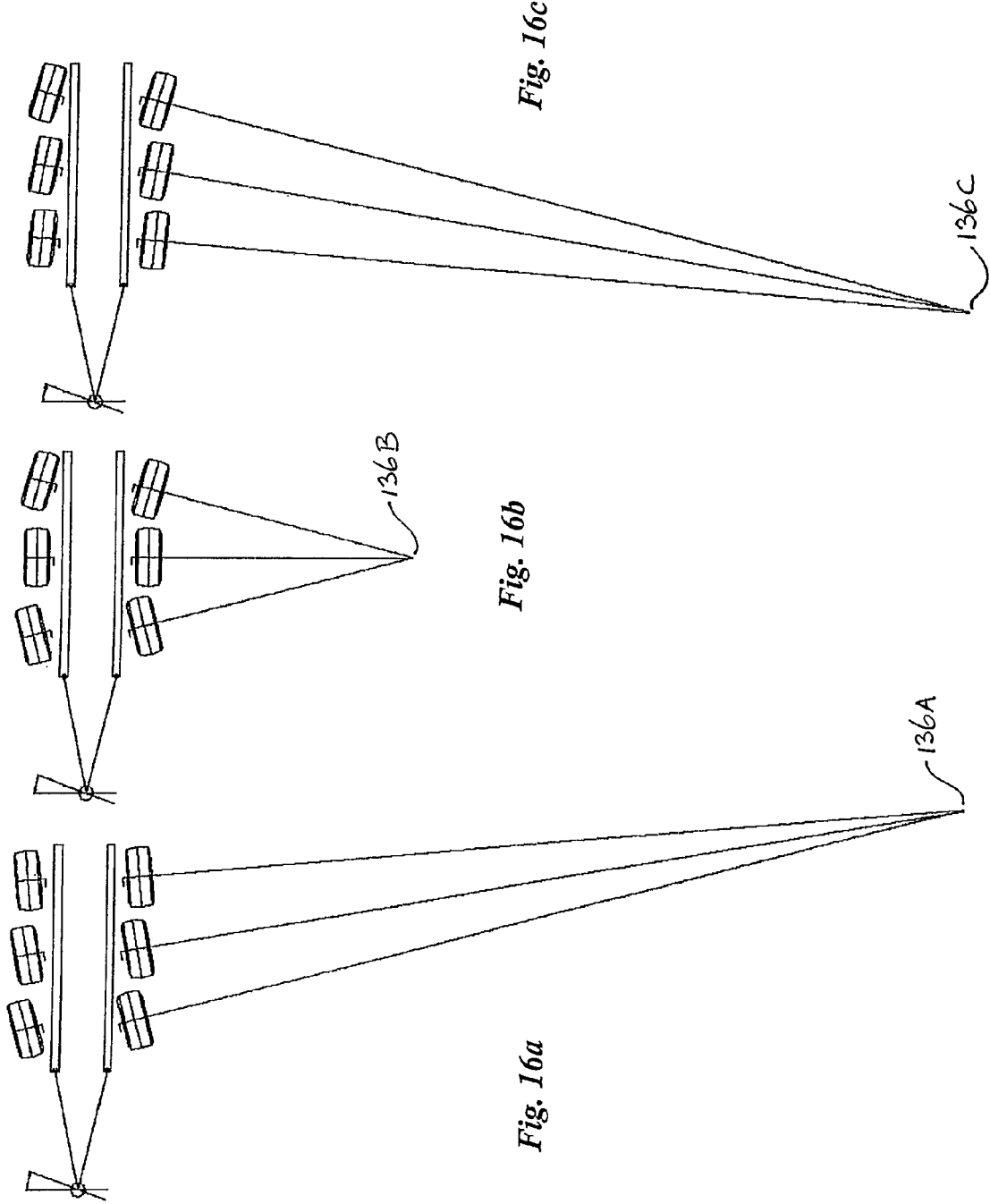

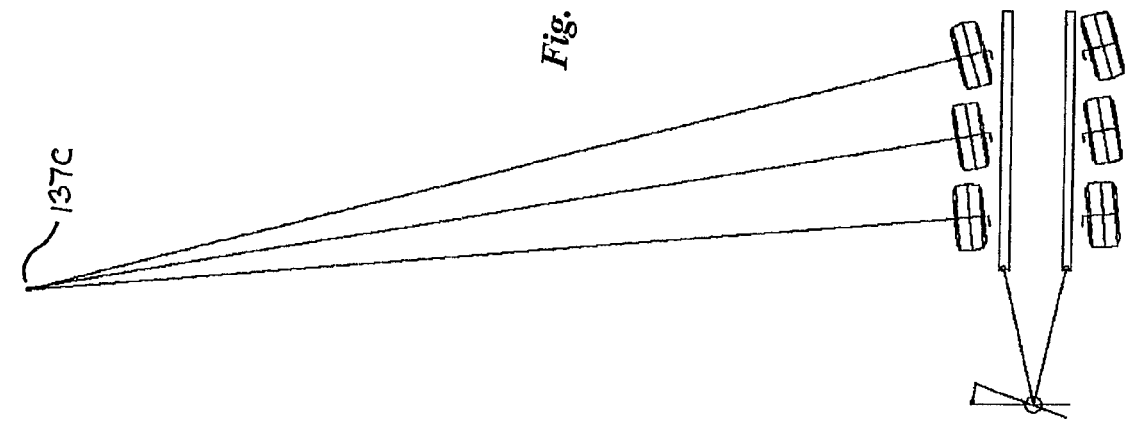
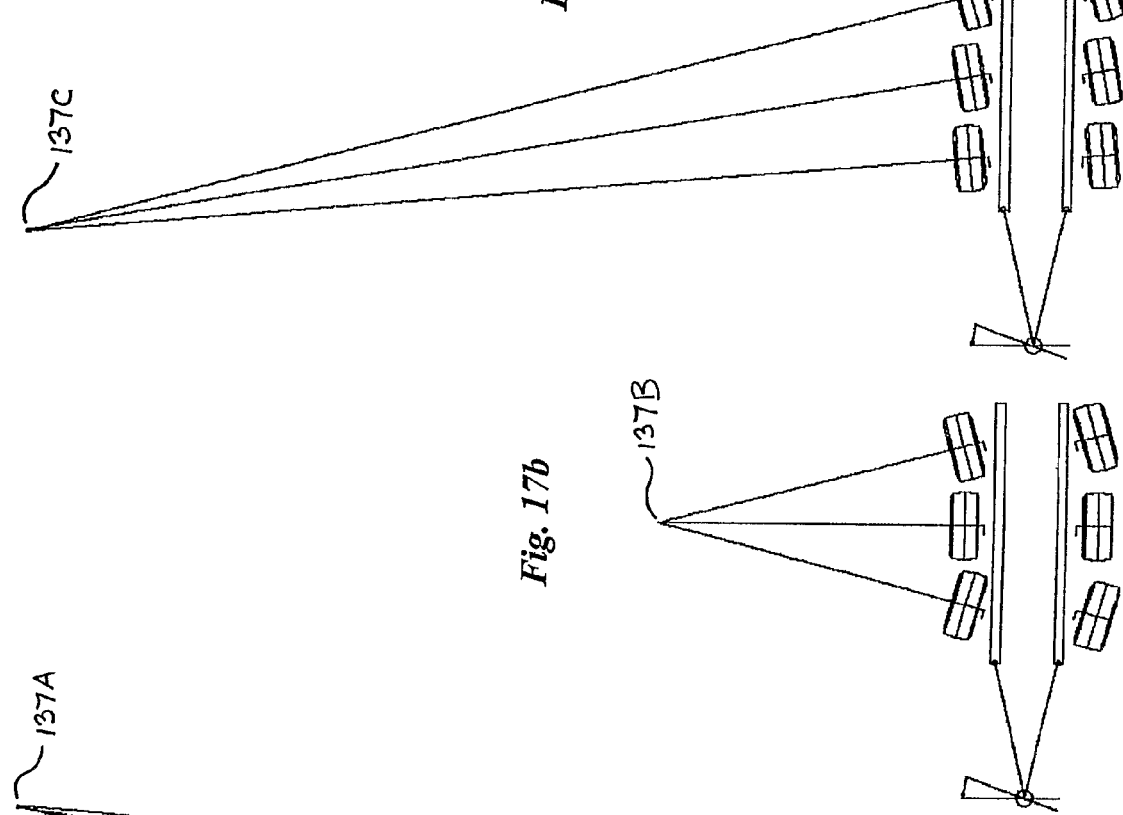
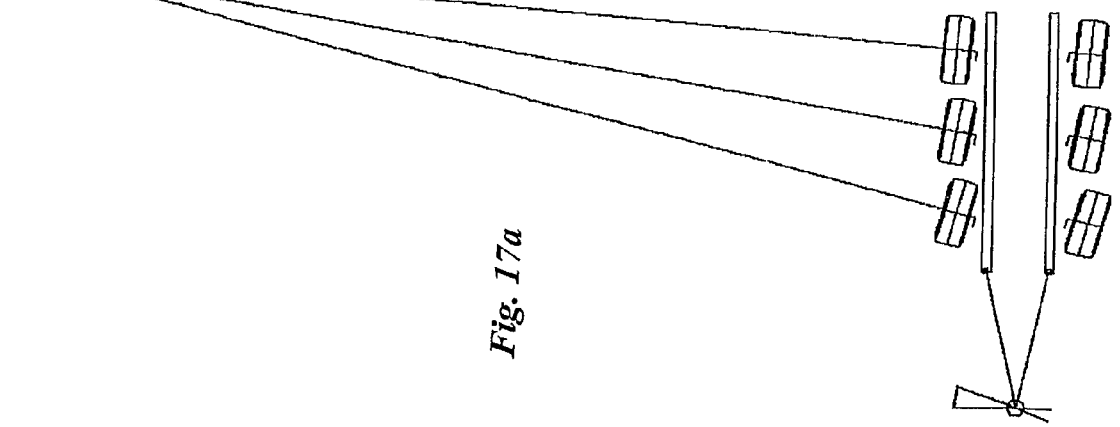
Fig. 17a
Fig. 17b
Fig. 17c

OPERATION OF SELF-STEERING AXLES ON SEMI-TRAILERS

This application is the U.S. National Phase under 35 U.S.C. §371 of International Application PCT/AU2007/000609, filed on May 8, 2007, which claims priority to Australian Patent Application No. 2006902381, filed on May 8, 2006. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

FIELD OF THE INVENTION

This invention concerns steering systems for trailers that form part of heavy goods vehicles. It is particularly applicable to heavy goods vehicles having a plurality of trailers.

BACKGROUND TO THE INVENTION

A major problem exists in the use of single and multiple trailers being towed one behind the other in truck-trailer or road train configurations. These vehicles are commonly referred to as combination vehicles, typically comprising either a rigid truck or prime mover and one or more semi-trailers and converter dollies.

In this specification the following explanations apply to certain terms:
  a) A "semi-trailer" is a towed vehicle unit of a heavy goods combination vehicle whose means of attachment to the preceding vehicle unit (a prime mover, another semi-trailer, or a converter dolly) results in some of its vertical load being imposed on said preceding unit through a tow coupling and whose rear is supported by a single axle or multiple axle bogie (tandem, tri, quad, etc.) located towards the rear.
  b) A "converter dolly" (also called a "dolly") is a towed vehicle unit of a heavy goods combination vehicle whose tow coupling to the preceding vehicle unit (a rigid truck, a prime mover or another semi-trailer) results in little or none of its vertical load being imposed on said preceding vehicle unit through the tow coupling and whose rear is supported by a single axle or multiple axle bogie (tandem, tri, quad, etc.) located at or near to the centre of the main load carrying area. The main load bearing or carrying area of a converter dolly usually incorporates a tow coupling device so that the dolly may be mounted beneath the front of a semi-trailer body, thereby converting the semi-trailer into a trailer with two axle groups of which the front axle group is steered by connection to the preceding vehicle unit. Internationally, a converter dolly is also known as a pivoting bogie, a dolly truck or a special truck. A converter dolly may also be adapted to carry goods.
  c) A "trailer" in a heavy goods combination vehicle is a towed vehicle unit that can be either a semi-trailer, or a combination of a converter dolly plus a semi-trailer, or a converter dolly adapted to carry goods.
  d) A "motor vehicle" in a heavy goods combination vehicle is a vehicle unit which is motorised for propulsion and is built to tow one or more trailers. One of the trailers may be a powered trailer. A motor vehicle can be a prime mover or a rigid truck.
  e) A "powered trailer" in a heavy goods combination vehicle is a trailer with a largely self-contained means of generating propulsion through one or more of its wheels. In a combination vehicle one or more of the trailers may be a powered trailer.
  f) A "prime mover" is a vehicle unit of a heavy goods combination vehicle built to tow a semi-trailer or a converter dolly. A prime mover may also carry a load.
  g) A "rigid truck" is a non-articulated motor vehicle built to carry a load and, in a heavy goods combination vehicle, tow a trailer.
  h) A "vehicle unit" is either a trailer, a semi-trailer, a converter dolly, a motor vehicle, or a powered trailer. Thus a combination vehicle has a plurality of such vehicle units connected by an articulated coupling between each adjacent vehicle unit.
  i) A "heavy goods combination vehicle" is a heavy goods or road transport vehicle with at least one articulation point.

A dynamic characteristic unique to combination vehicles is a tendency in a steering manoeuvre for each trailer in the combination to experience a higher level of lateral acceleration than the unit preceding it. This is referred to as rearward amplification and is a serious safety issue particularly in rapid path-change manoeuvres or abrupt steering events as it can lead to rear-trailer rollover. Rearward amplification improves with fewer articulation points and is strongly influenced by a range of mechanical properties, including trailer and dolly wheelbase dimensions, the type of tow coupling between vehicle units and the location of tow coupling points, tyre cornering stiffness, suspension mechanical properties, centre-of-gravity height and all-up weight.

Current designs and attempts to increase loads in trailers have led to rollover incidents in which a second or subsequent trailer overreacts to a steering deviation by the driver through the rearward amplification mechanism and rolls over. Particularly prone to this is the rearmost trailer, and to a lesser extent the rear trailer set if two or more semi-trailers are connected together in roll through a turntable (in which case the relevant vehicle units are said to be roll coupled).

An aim of the present invention is to provide a means of steering the wheels on the dollies of such trailers, not being the first vehicle unit in the combination vehicle, which reduces the likelihood and danger of such rollovers and allows safe transport of current and greater loads in trailers.

SUMMARY OF THE INVENTION

In one aspect the invention provides a dolly mounted by a pivoting connection beneath the front of a semi-trailer body, said dolly comprising:
  (a) road wheels attached in a plurality of axle sets to a dolly frame, each axle set extending across the dolly frame, the axle sets being mounted one behind the other from the front to the rear of the dolly frame,
  (b) a draw bar for connecting, at a tow coupling point, the dolly to an immediately preceding vehicle unit in a heavy goods combination vehicle such that, as said immediately preceding vehicle unit is steered towards one side and away from its opposite side, the dolly frame is steered by the draw bar relative to the semi-trailer body towards said one side, and
  (c) means for steering the wheels on said axle sets relative to the dolly frame such that:
    (i) at high speeds of travel along a road, as said vehicle turns towards said one side, at least some of said wheels are steered relative to the dolly frame to induce the dolly to move towards said one side, and
(ii) at low speeds of travel along a road, as said vehicle turns towards said one side, said wheels are steered relative to the dolly frame to induce the dolly to move towards said opposite side.

In another aspect the invention provides a combination vehicle for road transport of heavy goods, said vehicle comprising:
(a) a motor vehicle at the front, a first trailer attached so as to be towed behind the motor vehicle, and optional additional trailers also attached to be towed behind the motor vehicle, together forming a plurality of road transport vehicle units articulated one behind the other, said first trailer including:
  (i) a semi-trailer body adapted to carry goods,
  (ii) a dolly mounted beneath the front of the semi-trailer body, said dolly comprising road wheels attached in a plurality of axle sets to a dolly frame, each axle set extending across the dolly frame, the axle sets being mounted one behind the other from the front to the rear of the dolly frame, and said dolly frame attaching to the semi-trailer body by a pivoting connection, and
  (iii) a draw bar connecting, at a tow coupling point, the dolly frame to the vehicle unit immediately preceding it whereby as said tow coupling point on the immediately preceding vehicle unit is steered towards one side and away from its opposite side, the dolly frame is steered by the draw bar, and is thereby steered relative to the semi-trailer body towards said one side, and
(b) means for steering the wheels on said axle sets relative to the dolly frame such that:
  (i) at high speeds of travel along a road, as said vehicle turns towards said one side, said wheels are steered relative to the dolly frame to induce the dolly to move towards said one side, and
  (ii) at low speeds of travel along a road, as said vehicle turns towards said one side, said wheels are steered relative to the dolly frame to induce the dolly to move towards said opposite side.

In a further aspect the invention provides a method of controlling the sideways motion of a trailer forming part of a combination vehicle for road transport of heavy goods, said combination vehicle comprising:
a motor vehicle at the front, a first trailer attached so as to be towed behind the motor vehicle, and optionally additional trailers also attached to be towed behind the motor vehicle, together forming a plurality of road transport vehicle units articulated one behind the other,
said first trailer including:
  (i) a semi-trailer body adapted to carry goods,
  (ii) a dolly mounted beneath the front of the semi-trailer body, said dolly comprising road wheels attached in a plurality of axle sets to a dolly frame, each axle set extending across the dolly frame, the axle sets being mounted one behind the other from the front to the rear of the dolly frame, and said dolly frame attaching to the semi-trailer body by a pivoting connection, and
  (iii) a draw bar connecting, at a tow coupling point, the dolly frame to the vehicle unit immediately preceding it,
said method including:
(a) as said tow coupling point on said immediately preceding vehicle unit moves towards one side and away from its opposite side, using the draw bar connection to the coupling point to steer the dolly frame towards said one side relative to the semi-trailer body, and
(b) steering at least some of the wheels on said axle sets relative to the dolly frame such that:
  (i) at high speeds of road travel, as said vehicle turns towards said one side, steering said at least some wheels relative to the dolly frame to induce the dolly to move towards said one side, and
  (ii) at low speeds of road travel, as said vehicle turns towards said one side, steering said wheels relative to the dolly frame to induce the dolly to move towards said opposite side.

The method of controlling sideways movement may be applied to all, to some, or to only one trailer in the combination vehicle. If the method is applied to only one trailer in the vehicle, it is preferably applied to the rearmost trailer in the vehicle. If the method is applied to more than one trailer in the vehicle, it is preferably applied to those trailers closest the rear of the vehicle.

The means for steering the wheels on said axle sets relative to the dolly frame may operate such that:
  (i) at said high speeds of travel along said road, as said vehicle turns towards said one side, the wheels of said front axle set are steered relative to the dolly frame towards said one side, and
  (ii) at said low speeds, as said vehicle turns towards said one side, the wheels of said front axle set are steered relative to the dolly frame towards said opposite side.

There may be a plurality of axle sets extending across said dolly frame, so providing a front axle set, a rear axle set and optionally one or more middle axle set, and means for steering the wheels on said front and rear axle sets relative to the dolly frame such that:
  (i) at said high speeds, as said vehicle turns towards said one side, the wheels of said front axle set are steered towards said one side whereas the wheels of said rear axle set are steered towards said opposite side, and
  (ii) at said low speeds, as said vehicle turns towards said one side, the wheels of said rear axle set are steered towards said one side whereas the wheels of said front axle set are steered towards said opposite side.

Alternatively, said plurality of axle sets extending across the dolly frame provides a front axle set having one or more following axle sets behind it, and a rear axle set having one or more preceding axle sets in front of it, and the means for steering the wheels relative to the dolly frame may operate such that:
(a) at said high speeds, as said vehicle turns towards said one side, either:
  (i) the wheels of said front axle set are steered towards said one side while the wheels of each said following axle set on said dolly frame are also steered towards said one side, but with the wheels of each said following axle set steered towards said one side to a lesser degree than the wheels on its respective immediately preceding axle, or
  (ii) the wheels of said rear axle set are steered towards said opposite side while the wheels of each said preceding axle set on said dolly frame are also steered towards said opposite side but with the wheels of each said preceding axle set steered towards said opposite side to a lesser degree than the wheels on its respective immediately following axle, and/or
(b) at said low speeds, as said vehicle turns towards said one side, either:
  (i) the wheels of said rear axle set are steered towards said opposite side and the wheels of each said preceding axle set on said dolly frame are also steered towards said opposite side but with the wheels of each said preceding axle set steered towards said opposite side to a greater degree than the wheels on its respective immediately following axle, or (ii) the wheels of said rear axle set are steered towards said one side while the wheels of each said preceding axle on said dolly frame are also steered towards said one side, but with the wheels of each said preceding axle steered towards said one side to a lesser degree than the wheels on its respective immediately following axle.

Said motor vehicle may comprise a prime mover or a rigid truck. Said first trailer may be attached directly to the motor vehicle so as to be the second vehicle unit from the front in a combination vehicle, or may be attached behind a trailer so as to be the third or subsequent unit in a combination vehicle.

The means for steering the wheels relative to the dolly frame may comprise a mechanical linkage between the dolly frame, or the draw bar, or one or more of said axle sets, and the rear of said immediately preceding vehicle unit. Said mechanical linkage is preferably connected to the rear of said preceding vehicle unit by a linkage connection which is laterally offset from said tow coupling point. Preferably said offset varies with speed of travel.

The means for steering the wheels relative to the dolly frame may alternatively comprise mechanical, pneumatic, hydraulic or electric actuators mounted on the dolly frame or dolly axles and actuated by an electronic signal transmitted from the motor vehicle or vehicle unit preceding said first or each respective trailer in the combination.

One or more additional trailers may be included in the combination vehicle between the motor vehicle and said leading trailer.

BRIEF DESCRIPTION OF THE DRAWINGS

In order that the invention may be more fully understood there will now be described, by way of example only, preferred embodiments and other elements of the invention with reference to the accompanying drawings where:

FIGS. 16A, 16B and 16C are basic turning geometry diagrams and show the instantaneous turn centres for the low-speed turn situations illustrated in FIGS. 12, 5 and 14 respectively;

FIGS. 17A, 17B and 17C are basic turning geometry diagrams and show the instantaneous turn centres for the high-speed turn situations illustrated in FIGS. 13, 4 and 15 respectively.

DESCRIPTION OF THE PREFERRED EMBODIMENT AND OTHER EXAMPLES OF THE INVENTION

Figure 1:
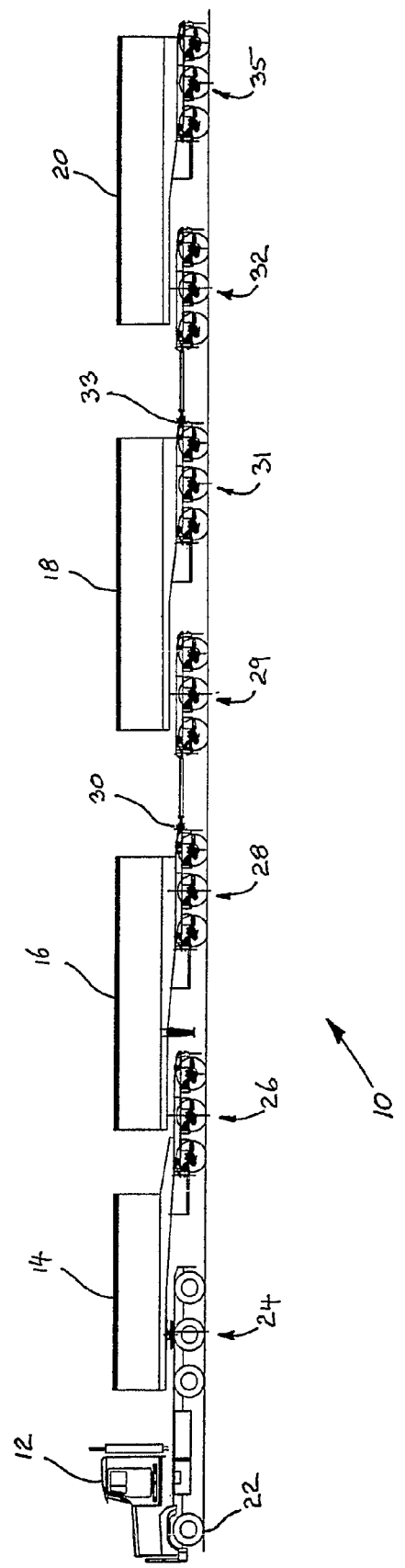
FIG. 1 is a view of a road train incorporating one embodiment of the invention.
Figure 2:
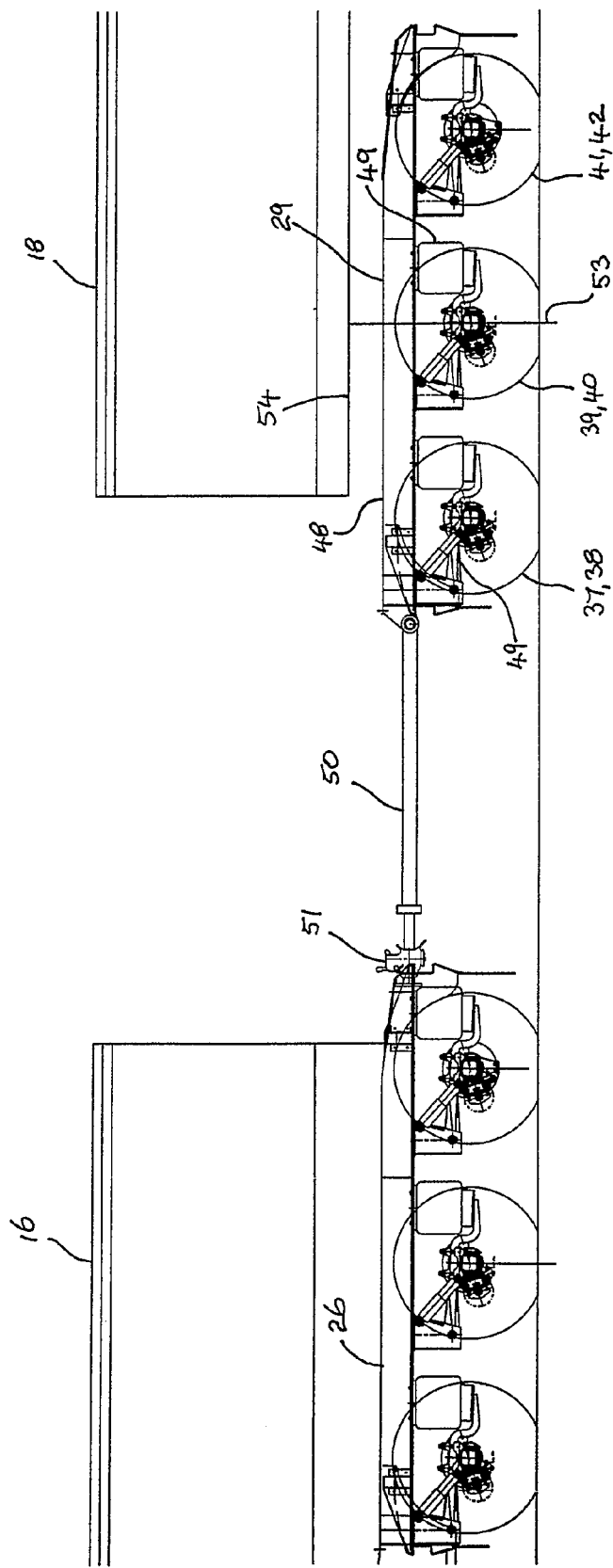
FIG. 2 is a view of two adjacent axle groups in the road train of FIG. 1.

Referring to the Figures, the combination vehicle 10 is a road transport vehicle which has the configuration of a BAA-quad road train having a total length of about 54 m. It comprises a prime mover 12 plus four semi-trailers 14, 16, 18 and 20 and two dollies 29 and 32 respectively. Semi-trailers 18 and 20 through dollies 29 and 32 have an A-type connection (pin-type tow coupling) 30 and 33 respectively with the trailers in front of them, 16 and 18, respectively, whereas semi-trailer 16 has a B-type connection (turntable tow coupling) with trailer 14. The prime mover 12 has a pair of steering wheels 22 and a triple axle rear axle group 24. The leading semi-trailer 14 has its front supported by the rear axle group 24 of the prime mover and its rear supported by a triple axle group 26. The front of the semi-trailer 16 is supported by triple axle group 26 and its rear supported by a triple axle group 28. Each of the semi-trailers 18 and 20 have a triple axle dolly (29 and 32 respectively) supporting their fronts and a triple axle group (31 and 35 respectively) at their rear.

Dollies 29 and 32 are the same. Dolly 29 is shown in FIGS. 2 to 5. Dolly 29 has six wheels 37 to 42 carried on three axle sets 44 to 46 attached to a frame 48 through a suspension system 49. The dolly 29 shown in FIGS. 3, 4 and 5 has a wide single wheel on each end of each axle set 44, 45 and 46, but the invention is also applicable to configurations having multiple wheels on each end of each axle. The dolly frame 48 pivots around a vertical axis 53 relative to the semi-trailer 18 by means of a turntable tow coupling 54. The frame 48 is attached to the semi-trailer 16 ahead of it by an A-frame drawbar 50, the tow coupling hitch 51 of which is attached to the centre of the rear of semi-trailer 16.

The front axle set 44 and the rear axle set 46 can be a slightly modified version of a conventional commercially available self-tracking axle, commercially available steerable axle, a purpose-built steerable axle, or individually steered wheels in either single or dual configuration. The middle axle set 45 is a conventional axle with no steering capability. Axle set 44 includes a pair of steering arms 78 and 79 connected together by a tie rod 52. The wheels 37 and 38 thus steer in either direction in unison.

Self-tracking axles are well known for use on heavy goods vehicles, such as prime mover and semi-trailer combinations having semi-trailer design maximum axle loads (each axle) in the order of 7 to 16t. Self-tracking axles are also known as self-steering axles, self-steer axles and castor-steering axles. They operate by the wheels being allowed to alter their alignment, by means of a castor action, in response to a turning movement of the vehicle.

Figure 3:
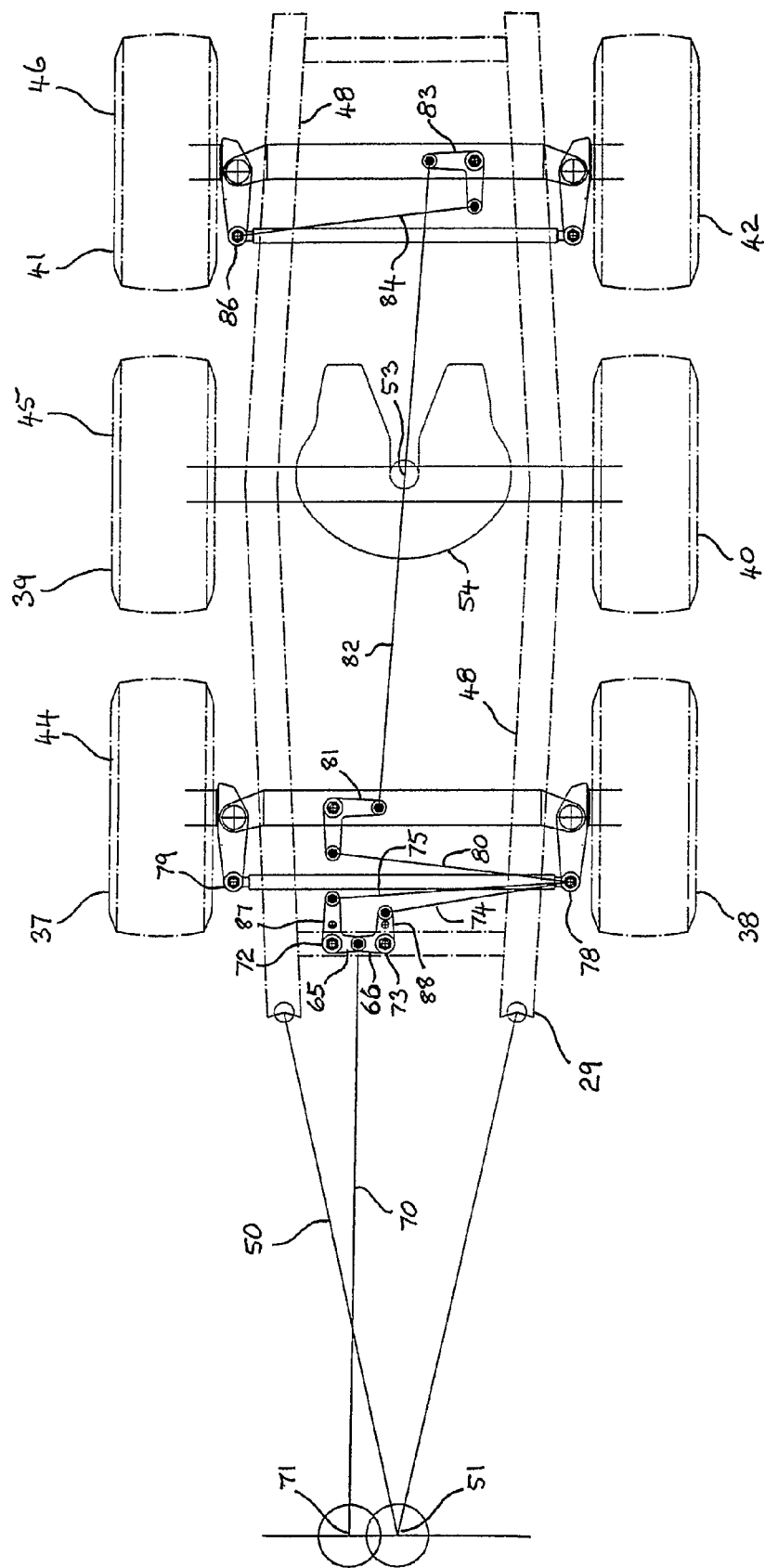
FIG. 3 is a detailed plan view looking down on a trailer dolly in FIG. 2; shown with its wheels positioned as for travelling straight ahead.

FIG. 3 shows a dolly where the means for wheel steering according to the invention is available at both low and high road speeds. An actuating rod 70 is connected from its front end 71 at an offset lateral distance from pin-type tow coupling 51 at the rear of semi-trailer 16 back to respective first arms 65 and 66 of a pair of bell cranks 72 and 73. One or the other of the second arms 87 and 88 (but not both simultaneously) of the bell cranks can be connected by respective secondary actuating rods 75 and 74 to a steering arm 78 on axle set 44. Rotation of one of the two bell cranks, 72 and 73, thereby cause the steering arm 78 to move and thus turn the wheels on axle set 44 towards the desired steering position. Bell cranks 72 and 73 are selectively actuated depending upon the speed at which the vehicle is travelling as described in the following description with reference to FIGS. 6 and 7.

Figure 4:
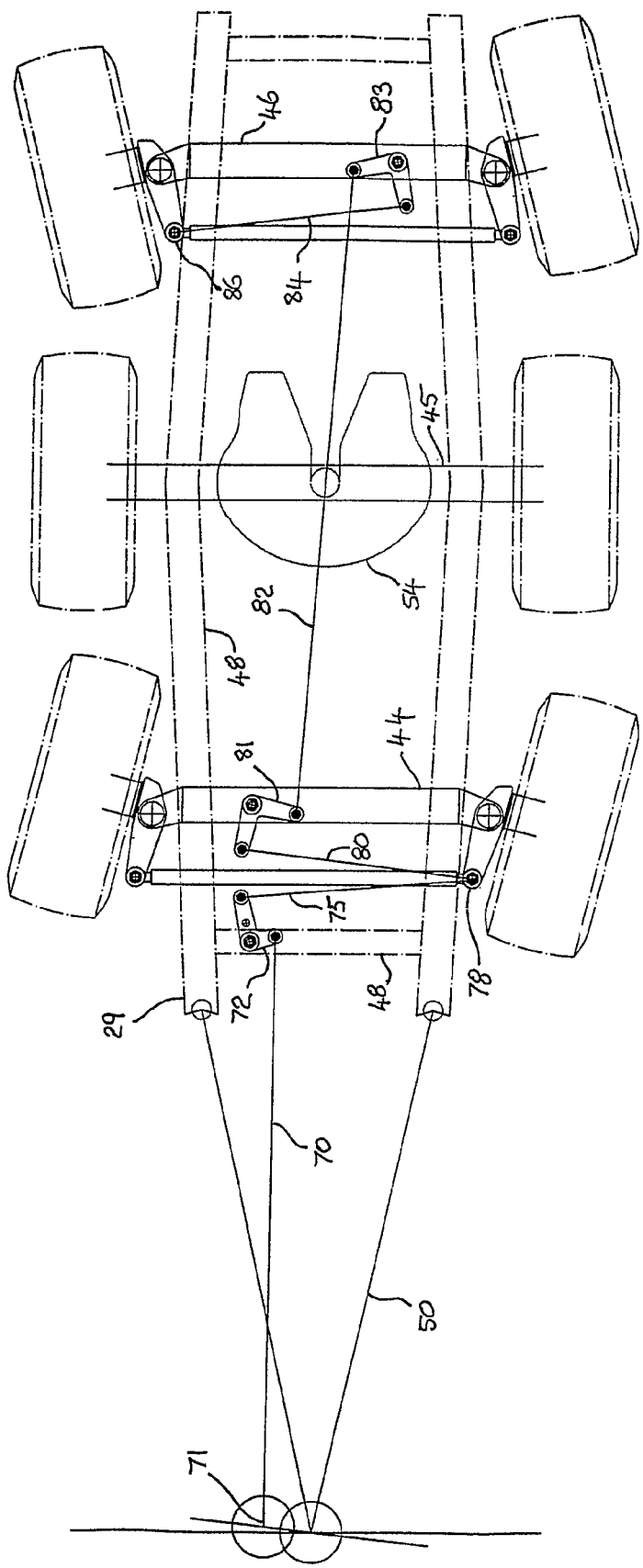
FIG. 4 is a view of the dolly in FIG. 3 but shown with its leading trailer being steered to the right while travelling at a relatively high speed of 80 km/h (wheel steer angles are exaggerated for illustration)

As seen in FIG. 4 for high road speeds, bell crank 72 is selected to transmit the steering force (for clarity bell crank 73 is not shown), and the crank 72 rotates in an anti-clockwise direction as the immediately preceding semi-trailer 16 turns to the right. This in turn draws the steering arm 78 upwards as viewed in FIG. 4 and thus the wheels on axle set 44 are also steered to the right. Also, by means of a mechanical linkage utilising in series actuating rod 80, bell crank 81, actuating rod 82, bell crank 83 and actuating rod 84, the steering arm 86 on axle set 46 is turned towards the left. This is opposite to the steering direction initiated for axle set 44.

The central pivots of bell cranks 72, 73, 81 and 83 are fastened to relevant portions of the frame 48.

Figure 5:
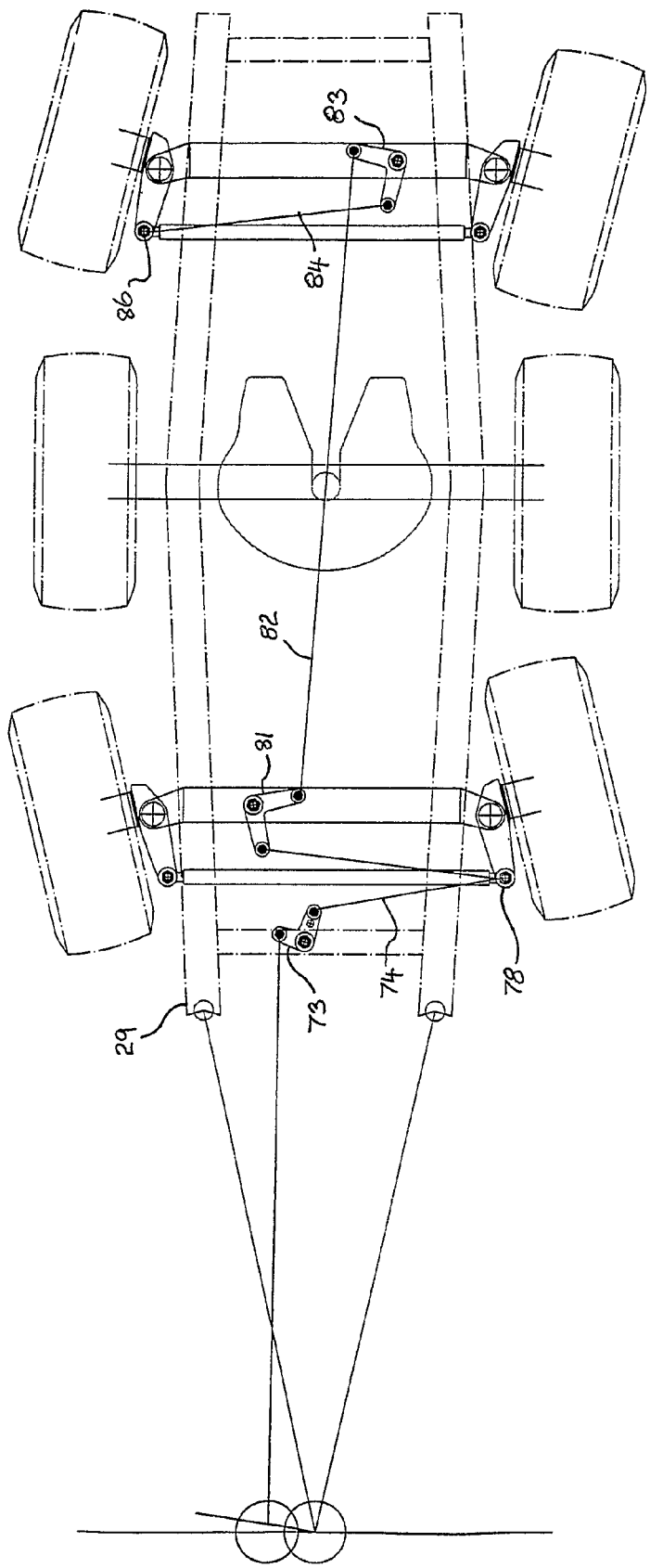
FIG. 5 is a view of the dolly in FIG. 3 but shown with its leading trailer being steered to the right while travelling at a relatively low speed of 5 km/h (wheel steer angles are exaggerated for illustration)

As seen in FIG. 5, when bell crank 73 is activated to transmit the steering force at low road speeds (for clarity bell crank 72 is not shown), a turn to the right by immediately preceding semi-trailer 16 would rotate bell crank 73 in a clockwise direction which causes the secondary actuating rod 74 to move the steering arm 78 downwards as shown in FIG. 5. At the same time the wheels 41 and 42 are turned towards the right by way of the steering linkage comprising actuating rods 80, 82 and 84 and bell cranks 81 and 83.

Figure 6:
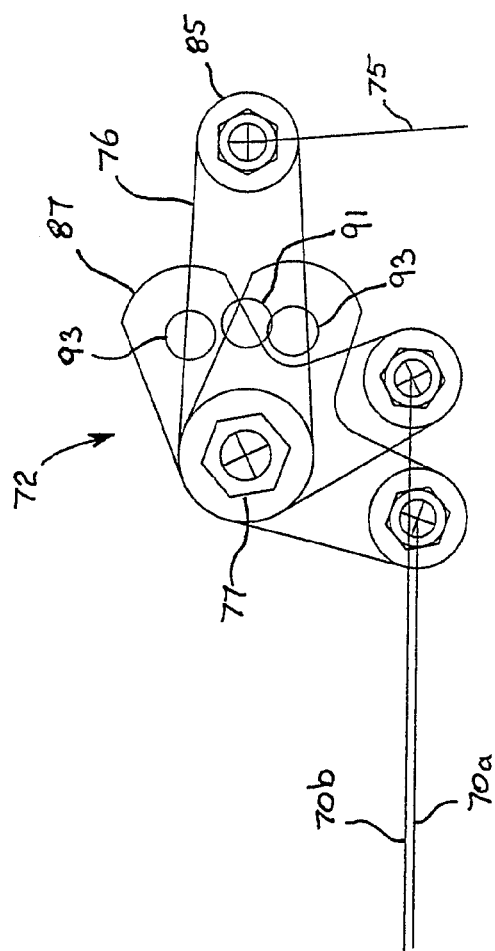
FIG. 6 is a view of one half of a dual bell crank arrangement (the half corresponding to high-speed) for selecting between low-speed steering operation and high-speed steering operation, with the particular bell crank shown at two extremes of its travel and not connected to an associated idler actuating arm.
Figure 7:
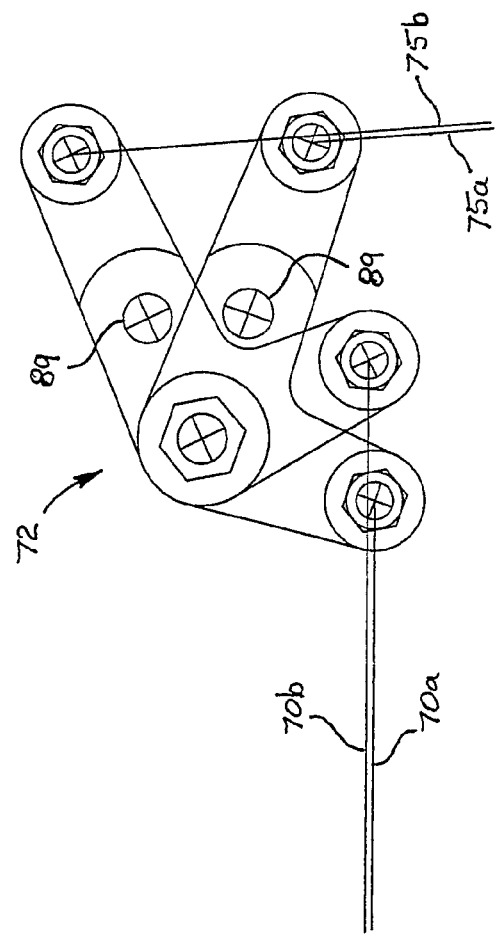
FIG. 7 is a view of the bell crank arrangement of FIG. 6 connected to the idler actuating arm and at two extremes of its travel.

The mechanism for individually selecting and actuating bell crank 72 or 73 will now be described. Referring to FIGS. 6 and 7, the second arm 87 of bell crank 72 comprises: (a) an idler arm 76 that pivots on the bell crank pivot 77 at one end and is connected at the other end 85 by the secondary actuating rod 75 to steering arm 78; and (b) the second arm proper 87 of the bell crank 72 which is shown not connected to the secondary actuating rod 75. At high road speeds, the idler arm 76 is selectively engaged and connected to the second arm proper 87 of bell crank 72 by a vertical engaging pin 89 when the hole 91 in the idler arm 76 and the hole 93 in the second arm proper 87 are in alignment. The second arm proper 87 of the bell crank 72 is by this means connected by pin 89 through idler arm 76 to secondary actuating rod 75 as shown in FIG. 7 in two distinct positions 75a and 75b. A similar arrangement is in place for bell crank 73 to be activated at low road speeds. The two engaging pins 89 (one for each bell crank) are arranged so that one or the other of the secondary arms 87 and 88 of respective bell cranks 72 and 73 can be connected to their respective actuating rods, 75 and 74, but not both simultaneously.

The advantages of the mechanism described are that, at low speed, there is a reduced tendency for subsequent trailers to track inwards on tight bends, such as when cornering at road intersections, whereas at high speed operation the "whipping" motion of a trailer associated with rearward amplification is attenuated rather than amplified.

In the case where a dolly has only two axles rather than the three axles as described above with reference to the Figures, it is preferred that the leading axle only is steered. In the case where a dolly has four axles rather than the three axles as described above, both leading axles and both trailing axles would be steered, or, alternatively, the two leading axles and the trailing axle would be steered.

Thus this embodiment of the invention contemplates that, when the vehicle is travelling along a highway at relatively high speed, the wheels on axle set 44 are steered in the opposite direction to the wheels in axle set 46, and at low speed the wheels on axle set 44 are steered in the opposite direction to those on axle set 46, but that the respective directions reverse for high and low speeds.

Figure 8:
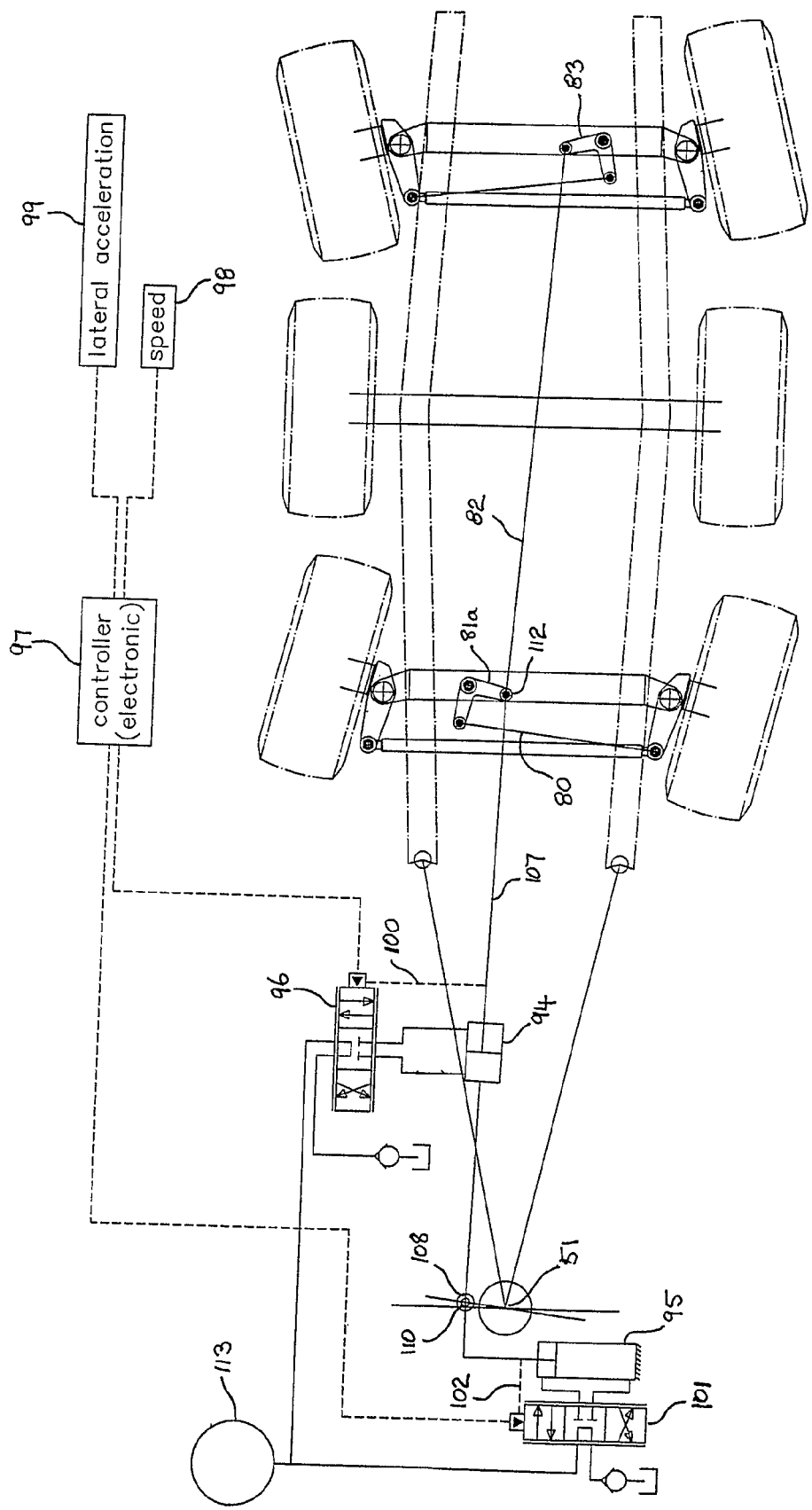
FIG. 8 is a schematic view of a trailer dolly incorporating a second embodiment of the invention.

FIG. 8 illustrates a further embodiment which does not utilise separate bell cranks 72 and 73, their selective actuation mechanism, or respective actuating rods 75 and 74 described above. Instead the simple bell crank 81 is used without an idler arm, and having its first arm 81a connecting directly to both the actuating rod 107 and actuating rod 82. The actuating rod 107 is connected from a connection point 110 at its front end 108 at the rear of semi-trailer 16 back to a connection point 112 on the first arm 81a of bell crank 81.

The rod 107 has a variable length and its connection point 110 has a variable lateral offset relative to the drawbar tow coupling 51. The length of actuating rod 107 and the lateral offset of its connection point 110 is controlled by the use of hydraulic linear actuators 94 and 95, respectively. A hydraulic pump 113 on the prime mover 12 powers hydraulic actuators 94 and 95. An electronic controller 97 receives electrical signals from a road speed sensor 98 and lateral acceleration sensor 99, uses these to compute the desired length of actuating rod 107 and the lateral offset of connecting point 110, and sends appropriate electrical signals to solenoid valves 96 and 101. Responding to these signals, solenoid valve 96 controls the extension or contraction of actuating rod 107 to the correct length by directing the flow of fluid into one or the other end of actuator 94 while using an automatic feedback mechanism 100. Actuator 94, solenoid valve 96, and the feedback control mechanism 100 are commercially available as one integrated unit.

In this embodiment, the polarity of adjustments made by the electronic controller 97 to the length of actuating rod 107 is sensitive to road speed such that at low speed the polarity of the adjustments are reversed to the adjustments to the length of the actuating rod 107 made at high speed. In one mode its operation is equivalent to the high-speed operating mode described above with reference to FIG. 4, while when the polarity is reversed its operation is equivalent to the low-speed operating mode described above with reference to FIG. 5.

Also in response to the electrical signals from the controller 97, the solenoid valve 101 controls the lateral offset of connecting point 110 by directing the flow of fluid into one or the other end of the actuator 95 while using an automatic feedback mechanism 102. This action directly controls the system steering gain, which is the amount of steer applied to the wheels in response to articulation angle.

The additional input of lateral acceleration from sensor 99 to controller 97 may be used to modify the steer either to achieve a desired level of lateral acceleration or to ensure physical limits, such as tyre/road friction, are not exceeded.

As an alternative to the use of hydraulic linear actuators 94 and 95, suitable pneumatic or electric actuators may be used.

Figure 9:
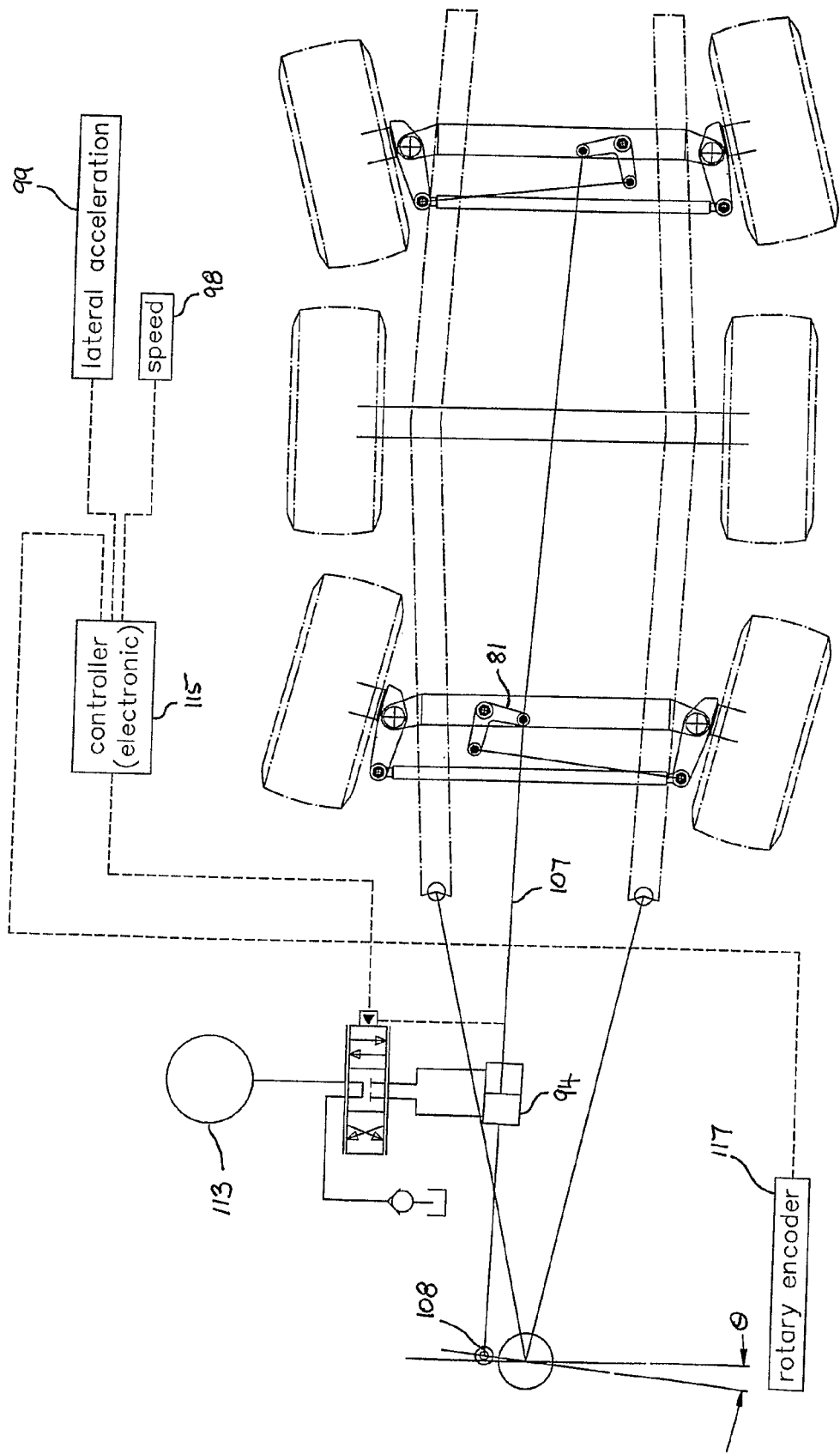
FIG. 9 is a schematic view of a dolly incorporating a third embodiment of the invention.

In a further embodiment, as shown in FIG. 9, the length of actuating rod 107 is variable and controlled by the use of hydraulic linear actuator 94 in the manner described for FIG. 8. However, its front connection 108 is fixed and, as in FIG. 8, its rear end is connected directly to bell crank 81. The electronic controller 115 has an additional input, which is the articulation angle θ between dolly frame 48 and preceding semi-trailer 16 as measured by a commercially available rotary encoder 117.

Figure 10:
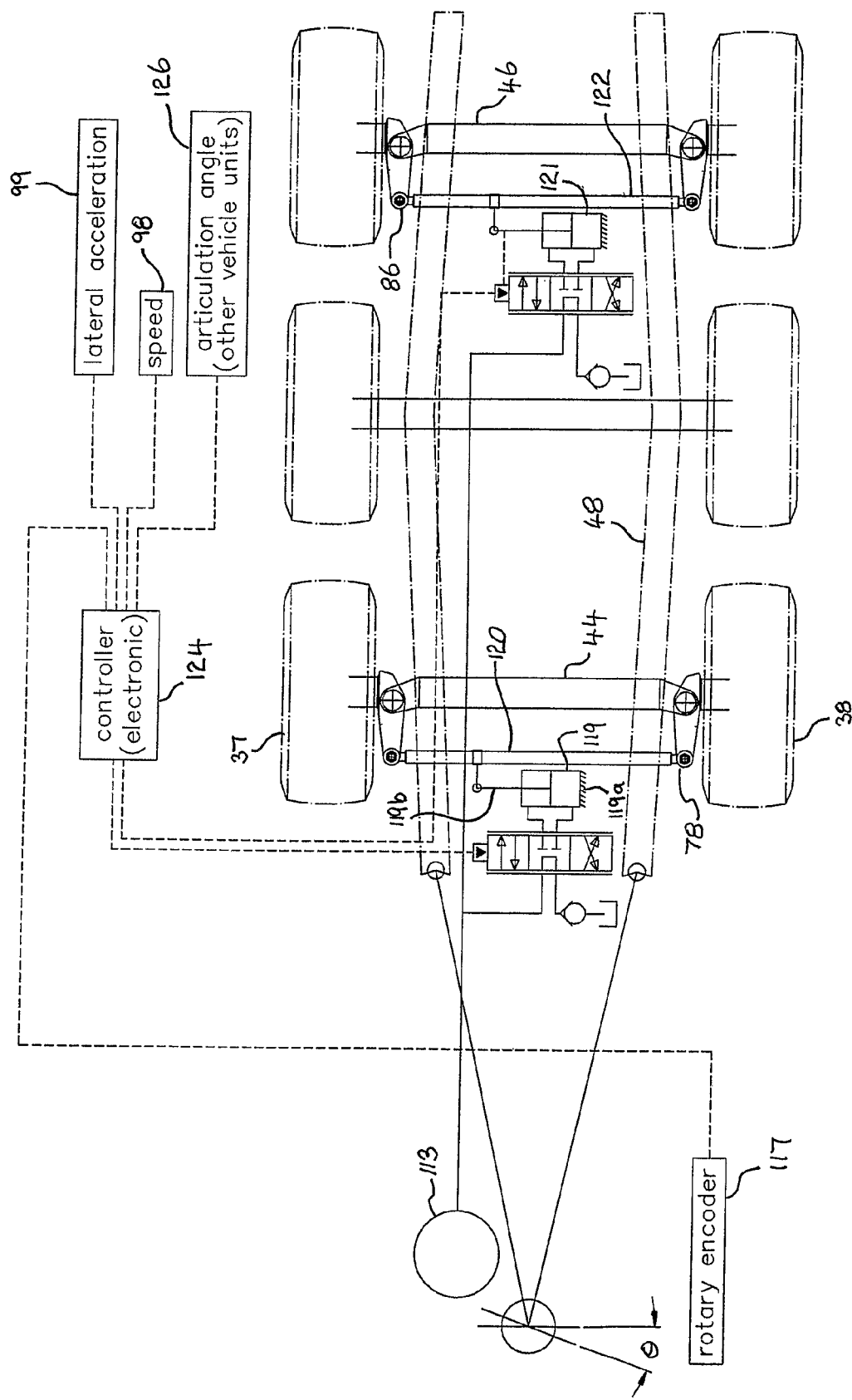
FIG. 10 is a schematic view of a dolly incorporating a fourth embodiment of the invention.

In a further embodiment, as shown in FIG. 10, the mechanical linkage actuating mechanism provided by rods 70, 80, 82, 84 and bell cranks 72, 73, 81 and 83 is replaced by a pair of hydraulic linear actuators, 119 and 121 (or equivalent pneumatic or electric linear actuators). One actuator 119 has its body 119a attached to the axle 44 and its actuating arm 119b attached to the tie rod 120 whereby the tie rod may be pushed in either direction relative to the axle 44. The tie rod 120 is connected at respective ends to steering arms 78 and 79. The wheels 37 and 38 have a natural castor tendency due to the geometry of the self-steering axle assembly, but the actuator 119 provides a means whereby the castoring can be counteracted and overcome by a controlled moment. The other actuator 121 is similarly attached between the axle 46 and tie rod 122 which is connected to steering arm 86. Actuators 119 and 121 are under automatic feedback control in the manner applied to actuators 94 and 95 described above. Similar to the electronic controller 115 of FIG. 9, electronic controller 124 has as inputs electrical signals from sensors 98, 99 and 126 that measure road speed, lateral acceleration, and articulation angle, respectively. But controller 124 also receives input from sensors 126 of articulation angles at other articulation points between adjacent vehicle units at other locations of the combination vehicle providing a preview of angles between vehicle units preceding the dolly and angles between vehicle units following the dolly that will be influenced by steer action applied to the dolly. The additional inputs to the controller of articulation angle between other vehicle units, and outputs from other sensors on other vehicle units such as lateral acceleration and yaw rate, not shown in FIG. 10, allow the steer strategy applied to individual dollies to be modified to work in concert with steer applied at other dollies to achieve an optimum outcome for the entire vehicle.

The actuators 119 and 121 may be connected to the frame 48 instead of to their respective axles 44 and 46, but this is not a preferred configuration because it may induce bump-steer characteristics in the trailer.

The use of hydraulic, pneumatic or electric actuators allows the electronic controller 124 to automatically vary the polarity of steering actions in response to road-speed and to adjust the steering gain in either discrete steps or continuously in response to road speed and lateral acceleration and articulation angle(s) in a way that is more flexible than in the previous embodiments described above. Further, the steering gain may be different for each trailer, and for the front and rear axle set of the same dolly, so that the steering angle applied to the wheels is different for each trailer so as to optimise the high- and low-speed performance of the combination vehicle.

While the degree of steering applied to the wheels may be varied in a step-wise or continuous manner depending upon the road speed and lateral acceleration, the dependence on articulation angle is preferably continuous.

Figure 11:
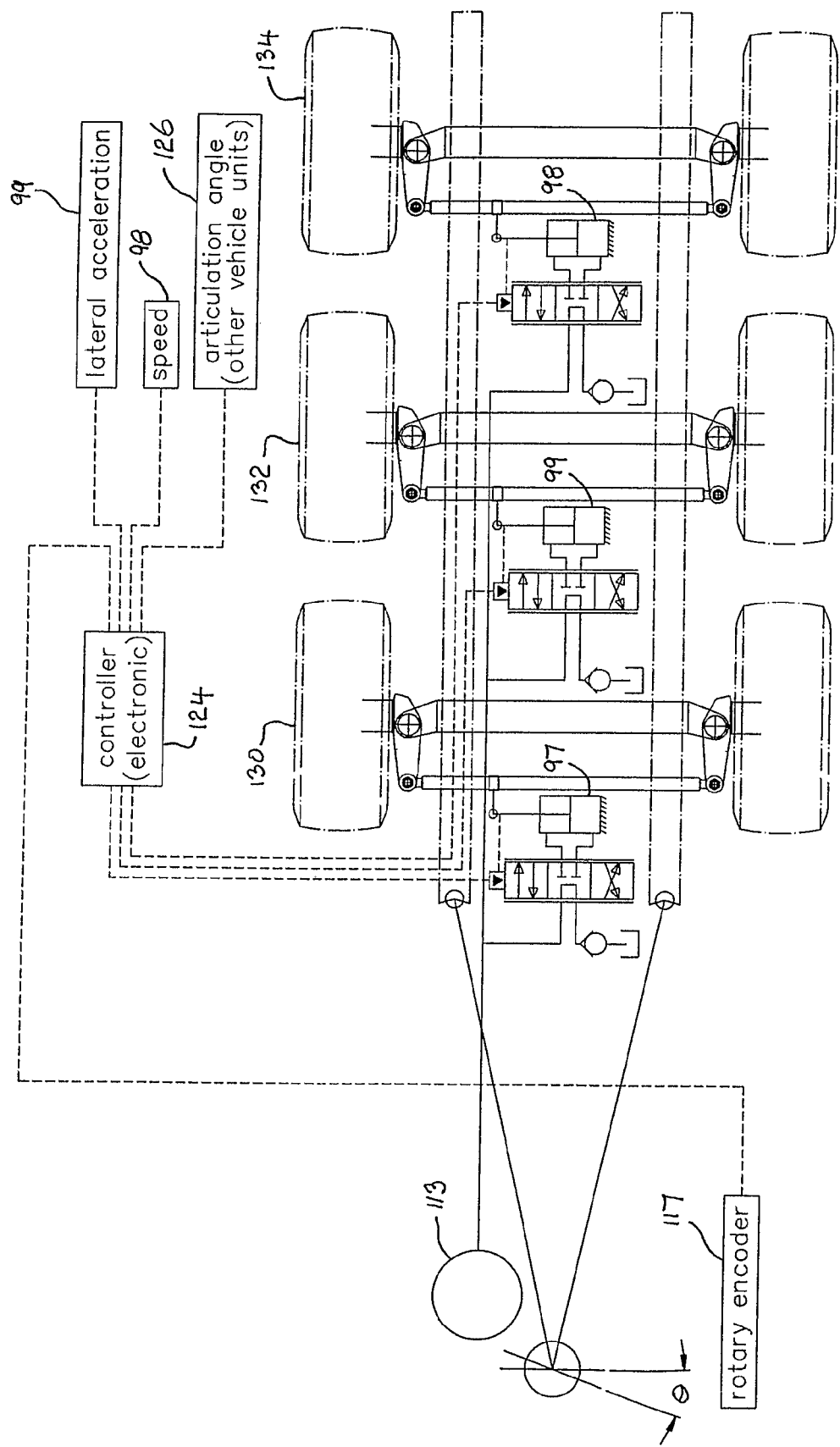
FIG. 11 is a schematic view of a dolly incorporating a fifth embodiment of the invention.

In a further embodiment, as shown in FIG. 11, all axles are steered by hydraulic (or pneumatic or electric) linear actuators 97, 98 and 99, allowing the electronic controller to automatically vary the polarity of steering actions in response to road-speed and to adjust the steering gain for individual axles in either discrete steps or continuously in response to road speed and lateral acceleration in a way that is even more flexible than in the previous embodiments described above. As before, the steering gain may be different for each dolly, and for the front, centre and rear axle set of the same dolly, so that the steering angle applied to the wheels may be different for each trailer and for each axle of the trailer so as to optimise the high- and low-speed performance of the combination vehicle.

Figure 12:
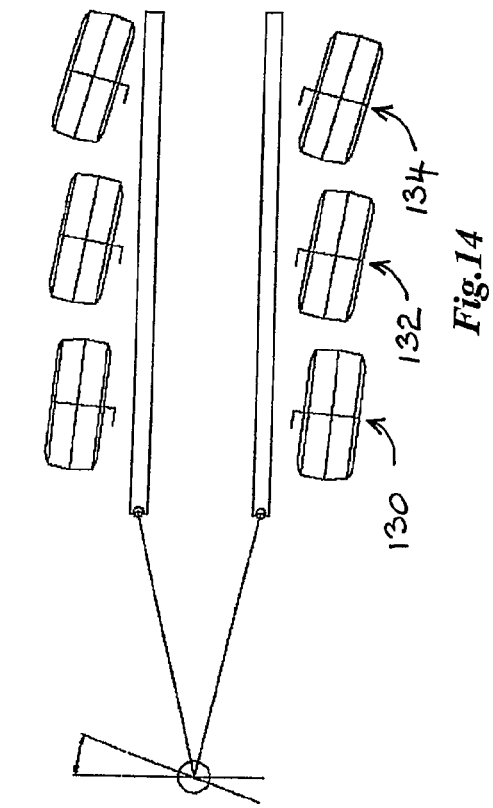
FIG. 12 shows an alternative steering configuration for operating the dolly of FIG. 11 at low road speeds.
Figure 13:
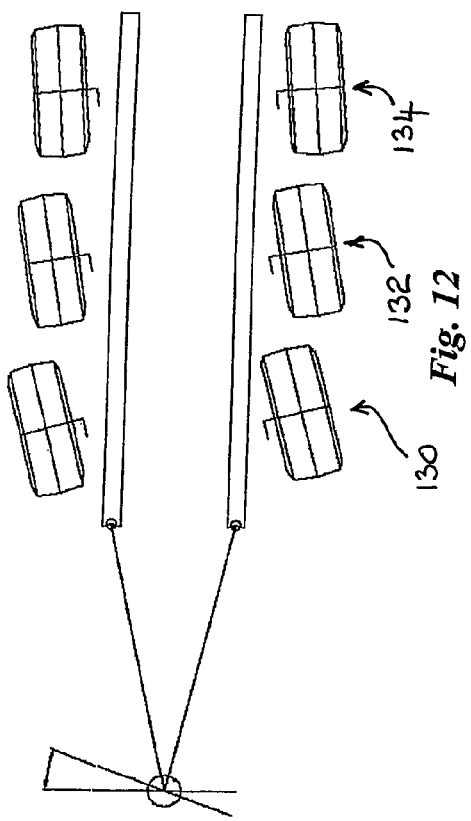
FIG. 13 shows an alternative steering configuration for operating the dolly of FIG. 11 at high road speeds.

Additionally, at low speed all the wheels on the front, centre and rear axle set may be steered as shown in FIG. 12, with the wheels on the front axle 130 turned in a direction opposite to said given direction, the wheels on the centre axle 132 turned in a direction opposite to said given direction but by a lesser amount than the wheels on the front axle, the wheels on the rear axle 134 in a direction opposite to said given direction but by a lesser amount than the wheels on the front and centre axles. As shown in FIG. 13, the respective wheel steer directions are reversed for operation at high road speeds.

Figure 14:
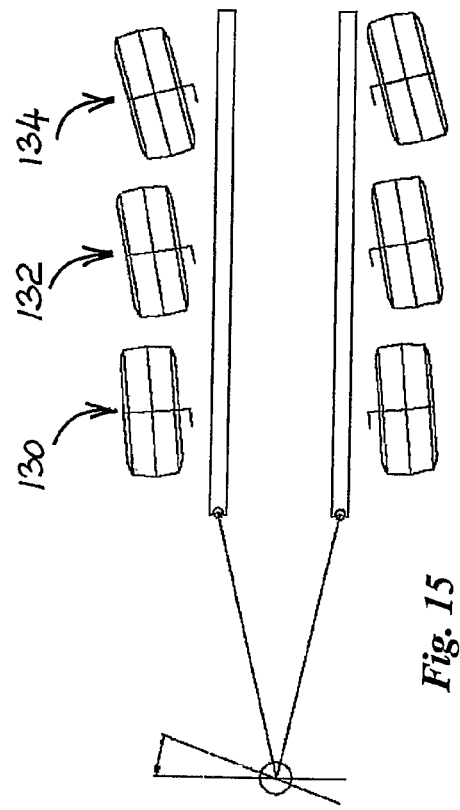
FIG. 14 shows a further alternative steering configuration for operating the dolly of FIG. 11 at low road speeds.
Figure 15:
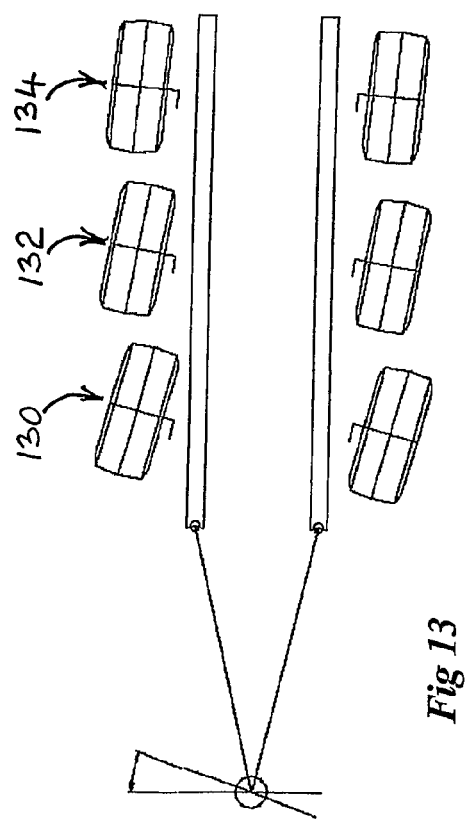
FIG. 15 shows a further alternative steering configuration for operating the dolly of FIG. 11 at high road speeds.

FIG. 14 shows an alternative arrangement for achieving the same nett effect at low speed of steering the dolly in a direction opposite to said given turn direction. At low speed all the wheels on the front, centre and rear axle sets 130, 132 and 134 respectively are steered with the wheels on the rear axle 134 in a direction the same as the said given direction, the wheels on the centre axle 132 in a direction the same as the said given direction but by a lesser amount than the wheels on the rear axle, and the wheels on the front 130 axle in a direction the same as the said given direction but by a lesser amount than the wheels on the centre and rear axles. FIG. 15 shows how, for operation at high road speeds, the respective wheel steer directions are reversed although the magnitude of the steer directions is substantially the same.

The operation of the embodiments illustrated in FIGS. 12 to 15 can be seen more clearly by reference to FIGS. 16A to 17C, which are basic steering geometry diagrams and draw on the concept of an instantaneous turn centre; the effective instant centre about which the dolly turns. FIGS. 16A, 16B and 16C illustrate three optional wheel steering positions, and the operating mode, for commencement of a low-speed turn to the right. They correspond to the turn situations illustrated in FIGS. 12, 5 and 14 respectively. In each case the vehicle (and thus the immediately preceding vehicle unit being semi-trailer 16) is steering to the right, and thus the draw bar 50 is steering the dolly frame 48 to the right, but the wheels are inducing the dolly to move to the left (thereby reducing low-speed offtracking), which is the side opposite to that towards which the dolly frame is being steered by the semi-trailer 16 in the usual manner for a conventional dolly.

As can be seen from FIGS. 16A, 16B and 16C, the alternative arrangements allow the location of the turn centre 136A, 136B and 136C respectively to be adjusted so that its location is either to the left and rearward of the dolly (FIG. 16A), directly to the left of the dolly (FIG. 16B), or to the left and forward of the dolly (FIG. 16C).

Similarly, FIGS. 17A, 17B and 17C illustrate three optional wheel steering positions, and the operating mode, for a high-speed turn to the right. They correspond to the turn situations illustrated in FIGS. 13, 4 and 15 respectively. In each case the vehicle (and thus the immediately preceding vehicle unit being semi-trailer 16) is turning to the right, and thus the draw bar 50 is steering the dolly frame 48 to the right. In these cases the wheels are also inducing the dolly to move to the right, which is the same side towards which the dolly frame is being steered by the semi-trailer 16 in the usual manner for a conventional dolly.

For combination vehicles that feature conventional dollies, it is important to note that at the commencement of a high-speed turn, the dolly tow coupling point on the preceding vehicle unit of a leading trailer—which is almost always located rearward of the centre of the axle group (this dimension is commonly referred to as the "coupling rear overhang")—moves laterally in a direction opposite to that of the turn. In a conventional dolly arrangement this causes the trailing dolly to initially turn and move in a direction opposite the intended turn direction. A short time later, as part of the normal sequence of events associated with the turn, the tow coupling point then moves in the direction of the turn and the trailing dolly frame is steered in the desired turn direction. This abrupt change of direction of the dolly associated with the initial reverse steer described above, sometimes referred as "whip", is the basis of the rearward amplification mechanism. One major advantage of preferred embodiments of the invention is that during the initial stages of the turn the wheels are steered relative to the dolly frame in the same direction as the turn. This action induces the dolly to move in the direction of the turn thus preventing the initial reverse-steer of the dolly frame, as described above, and thereby reducing or completely eliminating rearward amplification.

As can be seen from FIGS. 17A, 17B and 17C, the alternative arrangements allow the location of the turn centre 136A, 136B and 136C respectively to be adjusted so that its location is either to the right and rearward of the dolly (FIG. 17A), directly to the right of the dolly (FIG. 17B), or to the right and forward of the dolly (FIG. 17C).

The proximity of the turn centre to the dolly (close or far), its fore/aft location (forward, central or rearward), and the alignment of wheels on all axles to a single turn centre or multiple turn centres, can be precisely controlled by varying the amount of steer applied to each axle in the manner described above, thereby allowing the mechanical properties of all the dolly tyres to be efficiently utilised and both the high- and low-speed performance of combination vehicles to be optimised.

Figure 18:
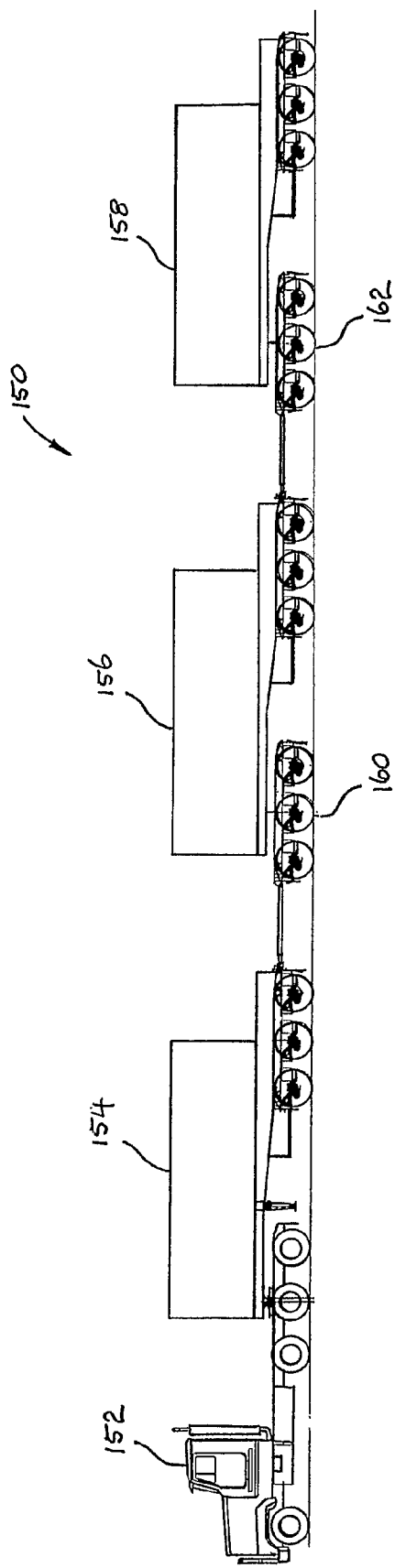
FIG. 18 shows an A-triple combination vehicle the subject of sophisticated numerical modelling by the present inventors.

Sophisticated analysis and numerical modelling by the present applicant has confirmed the improvement in dynamic stability of combination vehicles incorporating the present invention. A particular combination vehicle 150 studied was a triple trailer road train having an A-triple configuration as shown in profile in FIG. 18. The vehicle 150 comprises a prime mover 152, a frontmost semi-trailer 154, a middle semi-trailer 156, a rearmost semi-trailer 158, and two converter dollies, 160 and 162.

The operation of vehicle 150 was modelled to determine its handling behaviour when subjected to a Society of Automotive Engineers (SAE) standardised lane change test for evaluating the rearward amplification of multi-articulated vehicles. The manoeuvre is performed at a test speed of 88 km/h and on a test course with straight approaches to a 1.46 m lateral shift over a longitudinal distance of 61 m. When the conventional A-triple road train 150 using conventional dollies 160 and 162 was modelled, it was found to be unable to complete the manoeuvre due to the rearmost semi-trailer 158 rolling over towards the right hand side (the direction of the lateral shift) at 9.7 seconds after commencement of the manoeuvre. The same manoeuvre was then modelled for the same A-triple road train except that each of the two conventional dollies 160 and 162 were replaced by dollies in which the wheels were steered as described above with reference to dolly 29 shown in FIG. 3. The road train modified in this way was found to be able to easily complete the manoeuvre. Further numerical modelling by the present applicant has also confirmed improvements in low-speed offtracking.

Retrofitting of the invention is feasible to existing dollies but it is preferred to incorporate the systems from original manufacture. Dollies on existing trailers can be easily replaced with new dollies incorporating the steering system of the present invention.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

For example, although the above described embodiments of the invention show axles as solid axles in which wheels are mounted at either end of a rigid beam connected by a tie rod so that any movement of one wheel or steer action is transmitted to the opposite wheel, the invention is equally applicable to individually steered wheels or wheel pairs in a dual tyre set and independent axles, which allow each wheel or wheel pair (duals) to move vertically and steer without affecting the opposite wheel or wheel pair (duals).

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge.

The invention claimed is:

1. A method of controlling the sideways motion of a trailer forming part of a combination vehicle for road transport of heavy goods, said combination vehicle comprising:
    a motor vehicle at the front, a first trailer attached so as to be towed behind the motor vehicle, together forming a plurality of road transport vehicle units articulated one behind the other,
    said first trailer including:
        (i) a semi-trailer body adapted to carry goods,
        (ii) a dolly mounted beneath the front of the semi-trailer body, said dolly comprising road wheels attached in a plurality of axle sets to a dolly frame, each axle set extending across the dolly frame, the axle sets being mounted one behind the other from the front to the rear of the dolly frame, and said dolly frame attaching to the semi-trailer body by a pivoting connection, and
        (iii) a draw bar connecting, at a tow coupling point, the dolly frame to the vehicle unit immediately preceding it,
    said method including:
        (a) as said tow coupling point on said immediately preceding vehicle unit moves towards one side and away from its opposite side, using the draw bar connection to the coupling point to steer the dolly frame towards said one side relative to the semi-trailer body, and
        (b) steering only some of the wheels on said axle sets relative to the dolly frame such that:
            (i) at high speeds of road travel, as said vehicle turns towards said one side, steering only some of said wheels relative to the dolly frame to induce the dolly to move towards said one side, and
            (ii) at low speeds of road travel, as said vehicle turns towards said one side, steering only some of said wheels relative to the dolly frame to induce the dolly to move towards said opposite side.

2. The method of claim 1 wherein said means for steering the wheels on said axle sets relative to the dolly frame operates such that:
(i) at said high speeds of travel along said road, as said vehicle turns towards said one side, the wheels of said front axle set are steered relative to the dolly frame towards said one side, and
(ii) at said low speeds, as said vehicle turns towards said one side, the wheels of said front axle set are steered relative to the dolly frame towards said opposite side.

3. The method of claim 1 wherein said dolly includes a plurality of axle sets extending across said dolly frame, so providing a front axle set, a rear axle set and one or more middle axle set, said method including steering the wheels on said front and rear axle sets relative to the dolly frame such that:
(i) at said high speeds, as said vehicle turns towards said one side, the wheels of said front axle set are steered towards said one side whereas the wheels of said rear axle set are steered towards said opposite side, and
(ii) at said low speeds, as said vehicle turns towards said one side, the wheels of said rear axle set are steered towards said one side whereas the wheels of said front axle set are steered towards said opposite side.

4. The method of claim 1 wherein said first trailer is attached behind another trailer so as to be the third or subsequent unit in said combination vehicle.

5. The method of claim 4 wherein said first trailer is a rearmost trailer in said combination vehicle.

6. The method of claim 1 wherein the means for steering the wheels relative to the dolly frame comprises a mechanical linkage between the dolly frame, or the draw bar, or one or more of said axle sets, and the rear of said immediately preceding vehicle unit.

7. The method of claim 6 wherein said mechanical linkage is connected to the rear of said preceding vehicle unit by a linkage connection which is laterally offset from said tow coupling point.

8. The method of claim 7 wherein said offset varies with said speed of road travel.

9. The method of claim 1 wherein the means for steering the wheels relative to the dolly frame comprises pneumatic, hydraulic or electric actuators mounted on the dolly frame or dolly axles and actuated by an electronic signal transmitted from the motor vehicle or vehicle unit preceding said first or each respective trailer in the combination.

10. A combination vehicle comprising:
a motor vehicle at the front, a first trailer attached so as to be towed behind the motor vehicle, and more than one additional trailer also attached to be towed behind the motor vehicle, together forming a plurality of road transport vehicle units articulated one behind the other, wherein sideways motion of the rearmost of said trailers is controlled by the method defined by claim 1.

11. A dolly mounted by a pivoting connection beneath the front of a semi-trailer body, said dolly comprising:
(a) road wheels attached in a plurality of axle sets to a dolly frame, each axle set extending across the dolly frame, the axle sets being mounted one behind the other from the front to the rear of the dolly frame,
(b) a draw bar for connecting, at a tow coupling point, the dolly to an immediately preceding vehicle unit in a heavy goods combination vehicle such that, as said immediately preceding vehicle unit is steered towards one side and away from its opposite side, the dolly frame is steered by the draw bar relative to the semi-trailer body towards said one side, and
(c) means for steering the wheels on said axle sets relative to the dolly frame such that:
(i) at high speeds of travel along a road, as said vehicle turns towards said one side, only some of said wheels are steered relative to the dolly frame to induce the dolly to move towards said one side, and
(ii) at low speeds of travel along a road, as said vehicle turns towards said one side, only some of said wheels are steered relative to the dolly frame to induce the dolly to move towards said opposite side.

12. The dolly of claim 11 wherein said means for steering the wheels on said axle sets relative to the dolly frame operates such that:
(i) at said high speeds of travel along said road, as said vehicle turns towards said one side, the wheels of said front axle set are steered relative to the dolly frame towards said one side, and
(ii) at said low speeds, as said vehicle turns towards said one side, the wheels of said front axle set are steered relative to the dolly frame towards said opposite side.

13. The dolly of claim 11 wherein a plurality of axle sets extend across said dolly frame, so providing a front axle set, a rear axle set and one or more middle axle set, and means for steering the wheels on said front and rear axle sets relative to the dolly frame such that:
(i) at said high speeds, as said vehicle turns towards said one side, the wheels of said front axle set are steered towards said one side whereas the wheels of said rear axle set are steered towards said opposite side, and
(ii) at said low speeds, as said vehicle turns towards said one side, the wheels of said rear axle set are steered towards said one side whereas the wheels of said front axle set are steered towards said opposite side.

* * * * *